Nov. 13, 1962   C. C. SLATE   3,063,344
WIDE-ANGLE REAR VIEW MIRROR
Filed Aug. 1, 1960
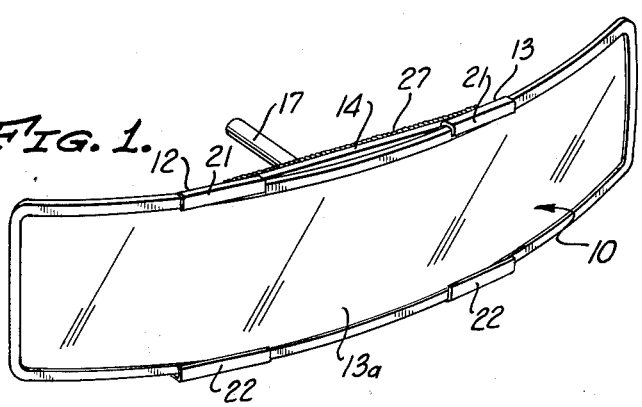
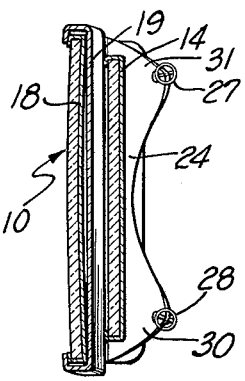
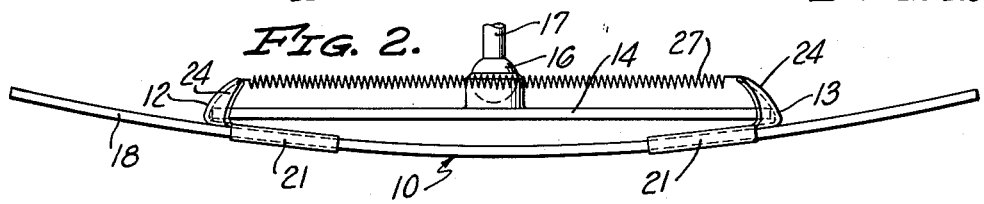
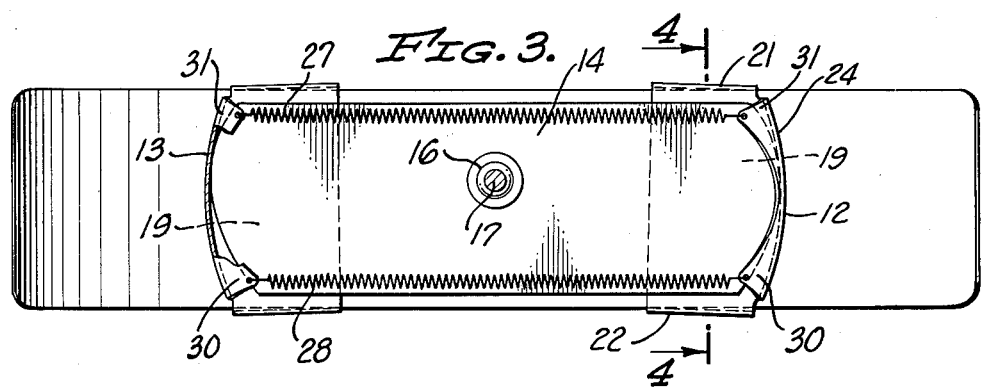
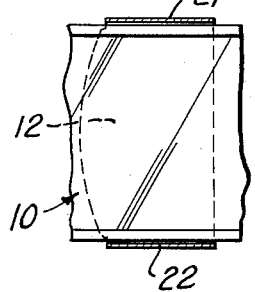
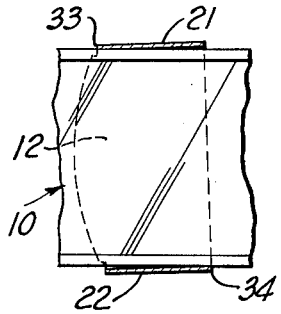
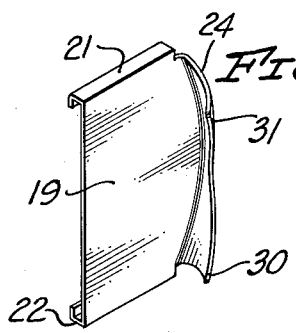
INVENTOR
CLAUDE C. SLATE
BY HIS ATTORNEYS
HARRIS, KIECH, RUSSELL & KERN

United States Patent Office 3,063,344
Patented Nov. 13, 1962

3,063,344
WIDE-ANGLE REAR VIEW MIRROR
Claude C. Slate, 705 Cumberland Road,
Glendale 2, Calif.
Filed Aug. 1, 1960, Ser. No. 46,765
3 Claims. (Cl. 88—98)

This invention relates to a wide-angle mirror assembly for attachment to a conventional rear view mirror of a car. With the wide-angle mirror assembly positioned on the rear view mirror, the driver of a car is provided with a much larger field of vision to the rear of his car than is normally had with the use of the conventional rear view mirror itself.

The conventional rear view mirror provides a restricted view to the driver, normally no larger than that to be had through the rear window. The driver is normally blind to the road areas lying immediately to either side and to the rear of his moving car. This is dangerous because cars in either of these blind areas are close and collision may well occur if the driver abruptly shifts lanes, placing his car in the path of the oncoming automobile. Conventional rear view car mirrors being relatively short and of a flat surface are not designed to furnish a view of these blind areas.

It is an object of the invention to provide a wide-angle mirror assembly readily attachable to the conventional rear view car mirror. It is a further object of the invention to provide a wide-angle mirror which, when placed upon the rear view mirror of the car, provides a wide-angle picture to include the blind spots normally experienced with the conventional mirror. A further object of the invention is to provide a wide-angle mirror assembly which, when positioned on the rear view mirror of the car, is friction locked into place.

Another object is to provide such a mirror assembly that can readily and securely be attached to any conventional car mirror of rectangular or trapezoidal shape, regardless of the specific shape or dimensions of the conventional mirror, and which can be adjusted longitudinally with respect thereto to provide a desired field of vision.

The invention also comprises novel details of construction and novel combinations and arrangements of components, which will more fully appear in the course of the following description. The drawing shows a preferred embodiment of the present invention, which is given by way of illustration and example.

In the drawing:

FIG. 1 is a perspective view of a wide-angle mirror assembly of the invention positioned on a conventional rear view car mirror;

FIG. 2 is a plan view of the mirror assembly of FIG. 1;

FIG. 3 is a rear view of the mirror assembly of FIG. 1 showing in greater detail the manner in which the assembly is held to the conventional rear view car mirror;

FIG. 4 is a sectional view taken through a supporting bracket of the assembly, along line 4—4 of FIG. 3;

FIG. 5 is a fragmentary front view, partly in cross section, of the mirror assembly, showing the position of the supporting bracket relative to the mirror, without spring bias;

FIG. 6 is the same view as FIG. 5 illustrating the relative positions of the supporting bracket and mirror with the application of spring bias to the bracket; and FIG. 7 is a perspective view of the supporting bracket removed from the assembly.

Referring to the drawing, the wide-angle mirror assembly of the invention includes a curvilinear mirror 10 and a pair of brackets 12 and 13 slidably mounted on the concave side of the curvilinear mirror and movable longitudinally along its length. The curvilinear mirror has a convex reflecting surface 13a of a length longer than the rear view mirror to which it is to be attached. The arc of the curved surface extends longitudinally of the mirror. The two brackets 12 and 13 are spring biased towards each other to grip the rear view mirror 14 therebetween.

A conventional rear view car mirror 14 is supported at its backside in a ball and socket joint 16 to a supporting member 17. As shown in FIG. 4, the mirror 10 is protected by a backing member 18 which is folded over at its outer edges to provide a peripheral retaining lip for holding the mirror to the backing member. Each of the two brackets 12 and 13 includes a relatively flat plate section 19, as best seen in FIG. 7, which engages the concave side of the curvilinear mirror. Forwardly extending L-shaped tabs 21 and 22 at the top and bottom of each bracket serve to grip respectively the top and bottom longitudinal edges of the curvilinear mirror to hold the bracket in slidable contact therewith. Each bracket is provided with a rearwardly-extending and inwardly-bowed rounded tab 24 formed along the outside edge of the mounting bracket. The tab 24 may be formed from an upturned end flange of the flat plate section 19. The tab may be arcuately bowed across the width of the plate section 19. The concave sides of the bowed tabs 24 of the two brackets face each other.

In the mirror assembly of the preferred embodiment illustrated, the spring bias for holding the two brackets 12 and 13 in contact with the rear view mirror is supplied by a pair of spaced coil springs 27 and 28 which are attached at their opposite ends to ears 30 and 31 of the inwardly-bowed tabs 24.

Each of the brackets 12 and 13, as best illustrated in FIG. 5, has a width somewhat larger than the width of the curvilinear mirror 10, thus providing some slack in the fitting of the bracket to the mirror. This slack not only facilitates movement of the bracket along the mirror with the relieving of the tension of the springs 27 and 28 but also cooperates with the sometimes irregular shape of the conventional mirror to provide a friction lock for the positioned mirror assembly. Car rear view mirrors, such as the mirror 14, seldom have squared ends but are generally provided with rounded ends of various shapes, or even trapezoidal ends. Because of the irregularly shaped ends, the brackets 12 and 13 will not squarely engage the mirror ends along their full width, with the result that the brackets are free to shift laterally to some extent under the tension of the springs 27 and 28. The L-shaped forwardly extending tabs 21 and 22 of each of the brackets 12 and 13 fit loosely over the edges of the mirror, with the result that the pull of the spring members 27 and 28 tends to rotate each of the brackets on a perpendicular axis relative to the face of the mirror 10, thus tending to retain the brackets in desired set positions as to the mirror. FIG. 5 illustrates the position of the bracket 12 without the application of spring tension. FIG. 6 illustrates the shifting of the bracket 12 with respect to the curvilinear mirror 10 with the application of the spring tension. It will be noted that the outside edge 33 of the top tab 21 of the bracket and the inside edge 34 of the lower tab 22 of the bracket dig into the respective upper and lower longitudinal edges of the curvilinear mirror 10. This engagement provides a friction lock for the positioned assembly, thus assuring that the curvilinear mirror 10 will not move longitudinally with respect to the mirror 14 under the effect of road jars or vibration.

It will also be understood that the tension springs 27 and 28 permit the brackets 12 and 13 to be separated or moved towards each other to permit application of the invention to conventional car mirrors of varying lengths. It is also to be noted that by grasping the brackets 12 and 13 with both hands and holding them so as to loosen the tension of the springs 27 and 28, the brackets 12 and 13 may be moved longitudinally with respect to the mirror 10 to permit a variety of possible positions of the mirror 10 relative to that of the mirror 14, to change the field of view as desired. It will be noted that the curvilinear mirror 10 of the assembly need not be exactly centered on the conventional car mirror, but, if desired, a larger portion of the mirror may be placed on the driver's side Another important feature of the invention is the transversely and vertically bowed configuration of the ends 24 of the brackets 12 and 13. The transverse bow accommodates the invention to conventional mirrors having square, rounded, or trapezoidal ends, and the vertical bow accommodates the invention to conventional mirrors of varying thicknesses.

The design of the mirror assembly 10 with the flexibility provided by the spring biased brackets 12 and 13 permits the use of the mirror assembly with rear view mirrors of various designs and makes. It is clear that features of the invention can be used independently of others and that the invention is capable of a variety of embodiments. The invention is not to be limited to the specific embodiment disclosed and illustrated herein but as defined in the following claims.

I claim as my invention:

1. A wide-angle mirror assembly adapted for attachment to a rear view mirror of a car comprising: a curvilinear mirror having a convex reflecting surface and a length longer than said rear view mirror, with the arc of the curve extending longitudinally of said curvilinear mirror; and a pair of brackets slidably mounted against the concave side of the curvilinear mirror and movable longitudinally along its length, said brackets being spring biased toward each other to grip said rear view mirror therebetween, each of said brackets including a relatively flat section for engaging the concave side of the curvilinear mirror, forwardly-extending L-shaped tabs at the top and bottom adapted to grip respectively the top and bottom longitudinal edges of said curvilinear mirror to hold the bracket in slidable contact therewith, and a rearwardly-extending and inwardly-bowed tab placed along the outside edge.

2. A device as set forth in claim 1 wherein the spring bias is provided by a pair of spaced spring members attached at their opposite ends to the inwardly-bowed tabs of the pair of brackets.

3. A device as set forth in claim 2 in which said L-shaped tabs of each of the brackets fits loosely over its edge of the mirror, so that the pull of the spring members will tend to rotate each of said brackets on a perpendicular axis relative to the face of said mirror to tend to retain said brackets in desired set positions as to the mirror.

References Cited in the file of this patent

UNITED STATES PATENTS

| 2,605,676 | Couch | Aug. 5, 1952 |
| 2,705,904 | Tagliaferri | Apr. 12, 1955 |

FOREIGN PATENTS

| 723,506 | France | Jan. 18, 1932 |